Feb. 5, 1957 T. SKEI ET AL 2,780,583
PREVENTION OF HYDROGEN BLISTERING AND FISSURING
Filed Oct. 25, 1954 4 Sheets-Sheet 3
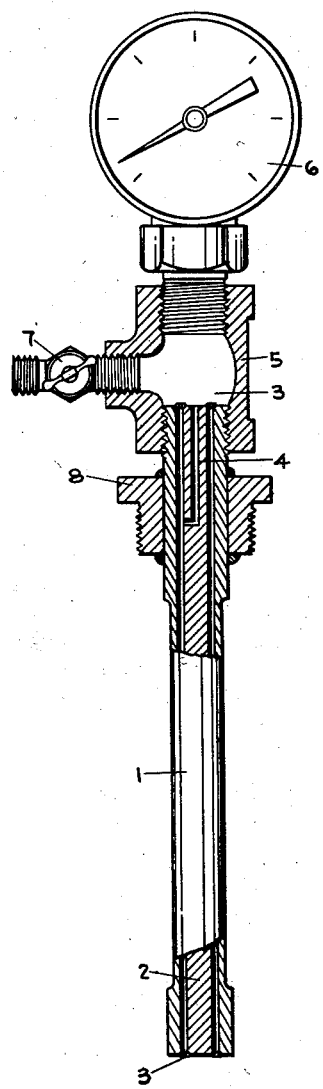
FIGURE III
Inventor: Thurston Skei
William A. Bonner
By: William V. Myers
Their Agent

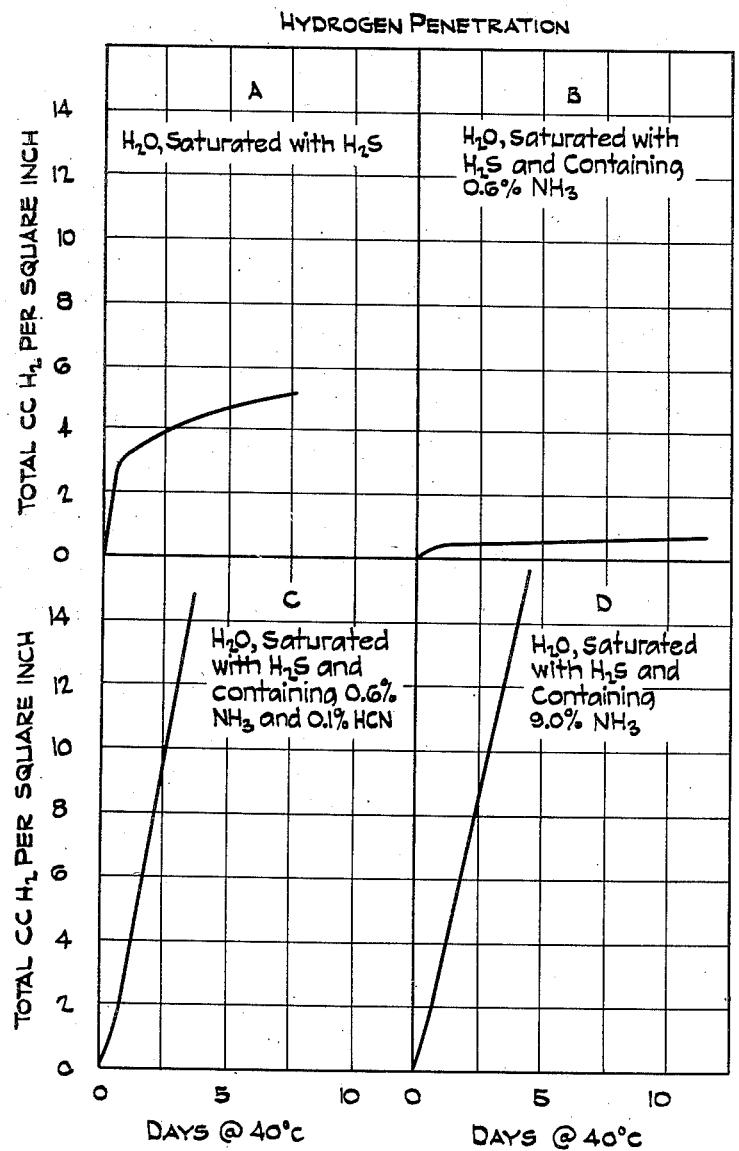
FIGURE I

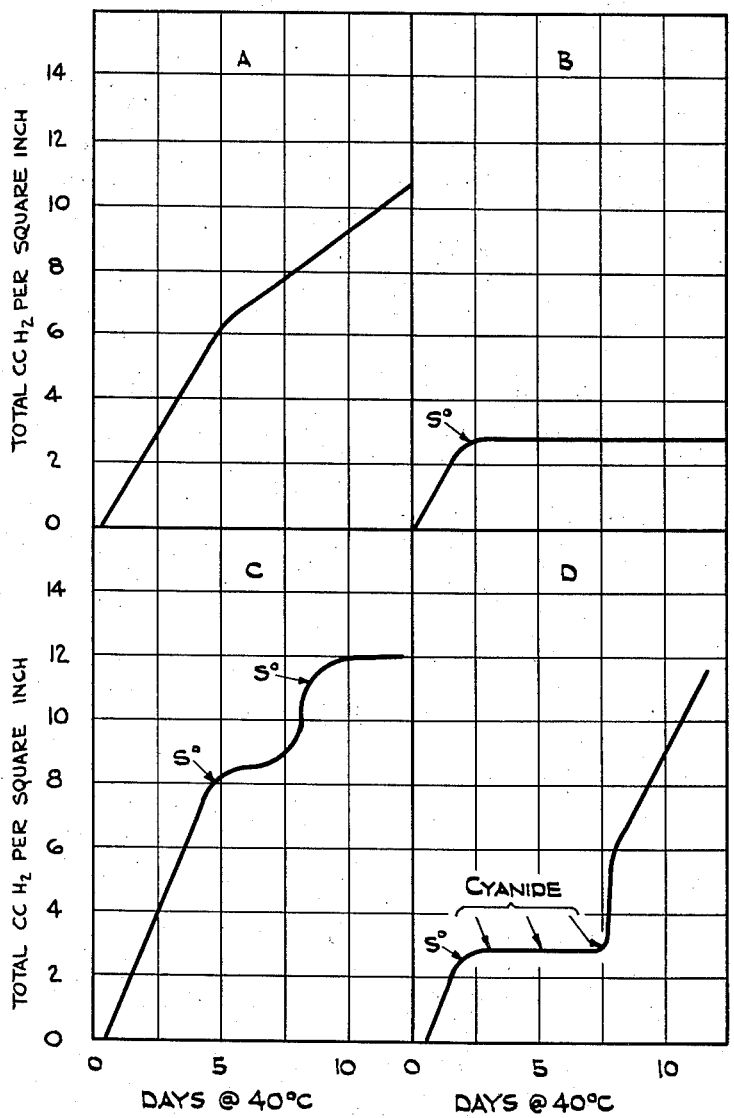
FIGURE II

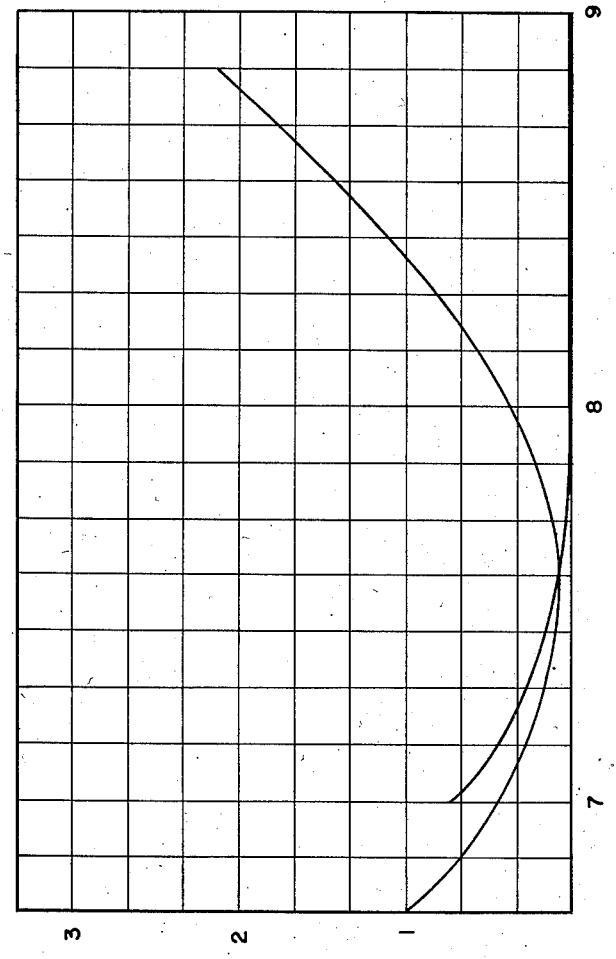
FIG. IV
INVENTORS:
THURSTON SKEI
WILLIAM A. BONNER
BY:
THEIR AGENT

United States Patent Office 2,780,583
Patented Feb. 5, 1957

2,780,583

PREVENTION OF HYDROGEN BLISTERING AND FISSURING

Thurston Skei, Lafayette, Calif., and William A. Bonner, East Alton, Ill., assignors to Shell Development Company, New York, N. Y., a corporation of Delaware Application October 25, 1954, Serial No. 464,246

10 Claims. (Cl. 196—41)

This invention relates to the prevention of hydrogen blistering and fissuring. More specifically, it relates to the prevention of hydrogen damage in equipment utilized in the production, handling and treatment of petroleum oils and fractions thereof. Additionally, it relates to methods of operating units utilized in such production, handling and treating operations so as to minimize or completely eliminate the problems associated with blistering and fissuring of the equipment utilized therefor.

These problems are closely related to, and often a result of, a phenomenon known as hydrogen penetration. This phenomenon is believed to be principally one involving diffusion to the metal of atomic hydrogen. The usual effect of penetration of atomic hydrogen into steels or other ferruginous metals is a marked change in the physical properties of the steel such that the steel becomes very brittle. This particular phenomenon is known in the art as "hydrogen embrittlement."

Under many circumstances of hydrogen embrittlement, if the conditions leading to penetration of atomic hydrogen into the steel are removed, the atomic hydrogen will be released from the metal and the properties of the steel will return to normal. Under other circumstances, however, the atomic hydrogen may combine with the metal to form molecular hydrogen, which is unable to diffuse further through the metal. If sufficient molecular hydrogen forms at any point, large pressures may be built up within the metal, causing it to rip or tear around this point of pressure build-up.

At least one of the factors influencing the formation of molecular hydrogen from atomic hydrogen is the presence of discontinuities or irregularities in the composition of the steel. These may result from impurities, such as slag inclusions, small voids caused by trapped gases and the like. Even the stress resulting from thermal treatment or cold working may give sufficient irregularity in the metal so as to promote formation of molecular hydrogen.

The result of the rupture of the metal by the molecular hydrogen pressure is usually observed on the metal surface as blister-like, raised portions or as open fissures. This physical stressing and rupturing observed as blistering and/or fissuring will be referred to hereinafter as "hydrogen damage."

The penetration of atomic hydrogen into steel has been widely studied. It is fairly well established that for the hydrogen to diffuse into the metal two conditions must be simultaneously met: There must be maintained on the surface of the steel a high concentration of atomic hydrogen and the surface of the steel must actively promote the acceptance of atomic hydrogen rather than catalyze the association of atoms to molecules of hydrogen. With respect to the first condition, it has been found that minute amounts of atomic hydrogen will yield (by diffusion into the metal and combination to molecular hydrogen), enough molecular hydrogen to cause very serious blistering and/or fissuring. Thus, there can be and often is extensive hydrogen damage with only a negligible amount of corrosion damage.

Hydrogen damage occurs particularly in the petroleum industry in equipment contacted by sour crudes, sour natural gases and gasolines, and like products which are known to contain appreciable quantities of hydrogen sulfide. When hydrogen blistering has been serious, a certain reduction therein may be effected by partial neutralization of hydrogen sulfide with a basic constituent such as gaseous ammonia. However, in instances where very large quantities of hydrogen sulfide were present, the injection of ammonia did not always alleviate the hydrogen damage. In fact, in many instances injection of ammonia has actually increased the difficulty. Moreover, the injection of large amounts of ammonia causes other difficulties, such as plugging of equipment by deposit of inorganic salts such as ammonium carbonate. The industry has suffered great losses by hydrogen damage due both to replacement requirements of equipment which has been extensively damaged and to operating time lost due to shut downs for repairs and inspections of equipment.

The normal overhead vapor stream from certain refinery operations may contain in addition to hydrocarbons and hydrogen sulfide appreciable amounts of hydrogen, carbon dioxide, carbon monoxide, water and ammonia. Hydrogen cyanide often is present, particularly in streams following a cracking operation.

In attempting to identify the causes of hydrogen damage the effect of some of the components already listed were investigated in the following manner: A hollow steel capsule was immersed in aqueous solutions of the compounds investigated. The inside of the capsule was connected to a gas meter by means of a capillary tubing. If the solution were an active promoter of hydrogen penetration, atomic hydrogen would diffuse through the metal and combine as molecular hydrogen on the inside of the capsule. The volume of hydrogen which diffused into the capsule was recorded by the meter and was a measure of the activity of the solution. The solutions were maintained between ambient room temperature and 40° C. during all tests. Hydrogen penetration in the absence of hydrogen sulfide was completely absent for all practical purposes. Results of some of the investigations are shown graphically in Fig. 1A–D.

As can be seen from Figure 1A, when an aqueous solution was saturated with hydrogen sulfide a high initial rate of hydrogen penetration was observed. The addition of moderate amounts of ammonia to a saturated hydrogen sulfide solution essentially prevented hydrogen penetration, as shown in Figure 1B. However by the addition of cyanide ions (see Figure 1C) it was found that after an initial period of low activity, hydrogen penetration commenced and remained at a high level. Similarly, addition of more ammonia to the solution (as indicated in Figure 1D) containing moderate amounts of ammonia also resulted in development of a highly active medium for penetration of hydrogen.

The exact phenomena involved in causing hydrogen penetration under these conditions have not been elucidated. However, it appears that the primary reaction for production of hydrogen may be represented by the following equation:

$$2HS^-(\text{or } H_2S) + Fe \rightarrow FeS + 2H + 2e^-$$

The solid iron sulfide formed frequently stifles further reaction unless removed from the steeel surface. Thus in the presence of cyanide ion the iron sulfide is dissolved as ferrocyanide and the hydrogen-producing reaction continues unabated. When large amounts of ammonia and hydrogen sulfide are present the corrosion product does not adhere to the metal surface and again the hydrogen-producing reaction continues unabated. This reaction is particularly prevalent at high pH values (above about 8.0) at a hydrogen sulfide partial pressure of 15 p. s. i. a. This reaction also occurs at lower pH values when the hydrogen sulfide pressure is increased to several atmospheres.

While the above theories are believed to be supported by fact, the present invention is not to be restricted to the validity of the theories, since the result of the treatment to be described hereinafter has been found to substantially inhibit hydrogen penetration.

It is an object of the present invention to substantially inhibit hydrogen blistering. It is a further object of the present invention to treat hydrocarbon streams containing aqueous dispersions of hydrogen sulfide so as to substantially reduce or inhibit hydrogen damage. Other objects will become apparent from the description of the invention.

Now, in accordance with the present invention, it has been found that hydrogen blistering of ferruginous metallic containers by hdrocarbon mixtures contaminated with atomic hydrogen-producing compounds and water may be substantially inhibited or prevented by maintaining said mixtures at a pH above about 7 and also maintaining therein a small amount sufficient to substantially prevent hydrogen blistering of an inorganic polysulfide which is soluble in the aqueous phase present in the system.

Still in accordance with this invention a preferred method for minimizing hydrogen blistering comprises the injection of an inorganic oxidizing agent (preferably an oxygen-containing gas) into a system containing hydrogen sulfide and an aqueous alkaline medium whereby a portion of the sulfide is oxidized to produce sulfur, the sulfur thereupon being dissolved in the aqueous alkaline sulfide medium to form polysulfides, which in turn have been found to substantially inhibit atomic hydrogen penetration. Suitable oxidizing agents which may be used in addition to or in place of oxygen include halogens (chlorine, iodine, bromine), chromates such as potassium or ammonium chromates, chlorates such as sodium or lithium chlorate, nitrites such as sodium or potassium nitrites, alkali metal sulfites, ferric salts, sulfur dioxide, and vanadic acid.

Alternatively, of course, a preformed water-soluble polysulfide may be injected into such systems, such as an aqueous solution of an amonium or an alkali metal polysulfide. A representative polysulfide solution which has been found to be effective can be made as follows: hydrated sodium sulfide (387 pts. by wt.) and sodium hydroxide (40 pts. by wt.) are dissolved in water (1000 pts. by wt.) to which sulfur (96 pts. by wt.) is added to form an aqueous solution which is about 1 molar in sodium hydroxide and about 1.5 molar in $Na_2S_3$. Alternatively, one can utilize spent caustic solutions obtained from $H_2S$ removal from gas streams and which are available as waste products at most petroleum refineries. Elemental sulfur can be dissolved in typical spent caustic solutions at the rate of about 107 g. of sulfur per liter of spent caustic to form a polysulfide solution which is highly effective for introduction into the subject systems, effecting the substantial reduction of hydrogen blistering.

It is postulated that polysulfide reacts with the primary corrosion product FeS to give a compound $Fe_xS_y$ (where- in $x$ is a variable integer of 1 or more and $y$ is an integer of 2 or more) that adheres to the steel surface and prevents further reaction:

$$S_2^= + FeS \rightarrow Fe_xS_y \text{ (on the surface)} + S^=$$

While the above theorized reaction of polysulfide ions in the substantial inhibition of hydrogen penetration has not been fully established, it has been found that when water soluble inorganic polysulfides are present in the aqueous phase and when the alkalinity of said phase is between pH of about 7 and about 10 (and preferably between pH 8 and about pH 9), hydrogen blistering is reduced to a minimum, particularly as long as a concentration of polysulfide in the order of at least about 0.1 g. per liter (expressed as free S of aqueous phase) is maintained at all times. Preferably the ammonium polysulfide is maintained between about 0.2 and 1 g. per liter of aqueous phase, although proportions in the order of between about 0.01—0.5% may be useful under the varying circumstances encountered throughout the wide variety of systems to which the present invention may be applied. The unexpected effect of maintaining close control of the pH utilized in conjunction with polysulfide addition to gas recovery systems and the like is emphasized by the data presented in Figure IV. The effect of pH on the hydrogen penetration rate observed under various conditions is shown in this figure. It will be seen that in the absence of air or polysulfide a minimum hydrogen penetration rate existed in the range between about pH 7.3 and 7.8. However, when air was injected with the consequent formation of excess polysulfide, the rate of hydrogen penetration essentially vanished for all pH's above about 7.8. Hence, the lower limit of pH for negligible hydrogen penetration is definitely set at this figure in gas recovery systems where air or polysulfide is present. It is important to emphasize that the minimum pH range is entirely different from the tolerable pH range wherein air or polysulfide is not being utilized.

While this sets the lower limit at ph 7.8, the upper limit is imposed by the deposition of by-product salts in operating equipment. At a number of locations in the normal gas recovery plant, ammonia or a base is used to maintain the desired pH. Under some operating conditions, the ammonia requirements may be relatively high. As a result, ammonium bicarbonate may be deposited in tubular equipment and lines. Both ammonium bicarbonate and ammonium carbonate monohydrate have been identified by X-ray diffraction in such deposits. Ammonium bicarbonate deposition increases with the partial pressure of carbon dioxide, the parital pressure of hydrogen sulfide and pH. On the other hand, solubility increases with temperature. A small change in pH has a relatively large effect on ammonium bicarbonate deposition. This is fortunate, since pH is usually more readily controlled than the other variables. Thus, to minimize both hydrogen penetration and hazards of solid salts depositing in normal refinery gas recovery systems, an upper limit of pH 8.3 is highly advisable, since above this maximum pH, deposition of solid salts within tubes or lines readily occurs. When the pH is maintained within the critical range of 7.8 to 8.3, substantially no deposition of ammonium bicarbonate or other solid salts occurs and the rate of hydrogen penetration is held to a minimum.

A third reason for maintaining the pH within the recited critical range is due to the rate of reaction of air with hydrogen sulfide to form sulfur, which in turn reacts with sulfide ions to form polysulfides. Experiments have shown that the oxidation of the sulfide ion to elementary sulfur and the consequent formation of polysulfide is a relatively slow process. On the other hand, the ionic reaction between polysulfide and cyanide (when present) in solution is rapid and complete. The rate of reaction between sulfide and oxygen increases with pH so that in the pH range of 7.8 to 8.3 satisfactory control of hydrogen penetration is obtained with air injection. In instances where unusually large quantities of cyanide are produced or where the residence time of air in the process stream is low, it is possible that the rate of formation of polysulfide may be insufficient to prevent hydrogen penetration in the equipment. The correct procedure in this case is to aerate some of the sour water available from the process and recycle it to the system as wash water in addition to air injection. The use of both polysulfide and air reduces the free cyanide content more rapidly than air injection alone.

Hydrogen blistering has been encountered particularly in systems involving hydrocarbon product streams containing hydrogen sulfide. The additional damage caused by the presence of hydrogen cyanide is especially prevalent in streams derived from petroleum cracking operations. However, hydrogen blistering is also associated with such processes as the pumping operation of crude oil from sour crude oil wells wherein sucker rods and the walls of the casing are subject to hydrogen attack; pipeline transportation of sour crude; sour gas recovery plants; and refinery gas plants operating on sour straight run gas from crude units.

The requirement for ammonium polysulfide (or other water-soluble polysulfide) will vary, of course, with the precise constituents present in any given system. For example, if cyanide is present, polysulfide ions react therewith to form thiocyanate. Moreover, ferrous sulfide reacts with polysulfide, also reducing the concentration of the latter. Consequently, it will be realized that the expression of the present invention cannot be based upon the introduction of a precise amount of polysulfide, but rather must be contemplated in terms of maintaining a minimum level of undestroyed polysulfide ions, such that hydrogen blistering is depressed to a minimum level. It is necessary in the present invention to maintain the aqueous phase in an alkaline condition, since acid destroys polysulfide.

The exact constitution of polysulfides is unknown and various authorities such as Ephraim regard polysulfides as constituting sulfide solutions containing dissolved free sulfur. However, according to other authorities, such as Kelsey and Dietrich (Fundamentals of Semi-Micro Qualitative Analysis), 1940, page 118, the polysulfide ions are understood to include a series of complex ions based upon sulfide ion (S=) reacted with sulfur S° to form $S_2^=$. This ion in turn may be coordinated with additional sulfur ions to form ions of greater complexity all of which are regarded as "polysulfides." The present invention is based upon the utilization of polysulfides which are soluble in water, principally comprising ammonium polysulfide, alkali metal polysulfides, such as sodium, potassium or lithium polysulfides and water-soluble alkaline earth metal or other polyvalent metal polysulfides, such as calcium polysulfides. For economic reasons and convenience, ammonium polysulfides and sodium polysulfides are preferred.

Due to the inherent difficulties involved in the quantitative analysis of plant and field petroleum streams, which difficulties are magnified by the varying complexity and concentrations of ingredients, it is substantially impossible at times to accurately analyze these streams to determine the requisite amount of polysulfide which must be added to the system to substantially inhibit hydrogen blistering. Consequently, an alternative procedure has been devised whereby it may be easily and quickly determined when the polysulfide has been reduced to a value such that hydrogen penetration is prone to recommence. This procedure involves the use of an instrument designated herein as the "standard hydrogen activity probe" which is illustrated in Figure III.

This probe consists substantially of a thin walled cylinder 1 made from a ¼ inch schedule 80 seamless carbon steel pipe (ASTM-A-106) 9½ inches long reamed to 0.313 inch inside diameter and reduced to 0.365 inch outside diameter over 6 inches of its length. A 5/16 inch cold rolled rod 2 is inserted therein so as to leave an annular space. The annular space is closed off at both ends of the cylinder by any suitable means, such as by welding 3. By means of a vent 4 through the center rod the annular space is connected to a pressure gauge 6. When hydrogen activity is to be determined in any piece of equipment, this probe is inserted through the wall of the equipment in such a manner that the tubular portion of the probe is exposed to the atmosphere within the equipment, and so that the pressure gauge is visible and readable from the outside. For convenience, the probe may be provided with a threaded collar 8 so that the probe may be screwed into a tapped opening in the wall of the equipment. A T 5 with a valve 7 is provided for relieving the pressure in the probe whenever necessary. The various portions of the probe should be selected so that the total internal volume of the probe is about 10 cubic centimeters.

If the atmosphere within the equipment is actively promoting atomic hydrogen penetration, such atomic hydrogen will diffuse through the thin wall of the probe cylinder, will combine to form molecular hydrogen within the annular space, and will build up a pressure therein which will be registered on the gauge. By noting the rate of increase in pressure with respect to time, the hydrogen activity of the atmosphere within the equipment may be reasonably accurately determined. It has been found that in order to protect equipment from hydrogen damage, the polysulfide content of the aqueous phase should be maintained at a level such that the standard hydrogen activity probe indicates a rate of increase in pressure of less than about 1 lb. per day, and preferably less than about 0.5 or even 0.2 lb. per day.

Variations of the above-described standard hydrogen activity probe may be used; but in order that the indicated pressure variations should be comparable to those for the specific probe described herein, the internal volume of the probe, the surface area exposed to the blistering activity, the thickness of the metal wall through which atomic hydrogen penetrates, and the type of metal should be all the same as in the described standard probe. Various expedients may be employed in reducing the requirement for polysulfide addition or formation in these systems, such as water washing, which is primarily designed to remove hydrogen cyanide. This is disclosed in a copending application of Effinger and Renquist, Serial No. 223,396, filed April 27, 1951, now abandoned.

The formation of polysulfide (or addition of preformed polysulfide) in alkaline systems containing cyanide radicals results in the reaction of polysulfide with cyanide to form thiocyanate radicals. If thiocyanates are allowed to accumulate in water accumulators or separators, it has been found that corrosion products, such as ferrous sulfide, iron thiocyanate and the like, are formed which cause plugging of screens and obstruction of the hydrocarbon flow from the bottom of columns such as absorber columns. This is particularly noticeable in gas recovery systems connected with petroleum refineries. Investigation of this adverse phenomenon showed that water accumulating at the bottom of gas absorption columns in a gas recovery unit had a pH in the order of about 5.0. On cooling a sample of the accumulated water from such a column, a crystalline material was formed which was identified by X-ray diffraction as ammonium thiocyanate. The design and operation of the column should not be such as to prevent complete removal of ammonium thiocyanate from the bottom of the absorber column under normal processing conditions. Failure to allow for such removal may result in corrosion of such equipment as the low carbon steel valve seats of compressors. Deposits on the valve seats have been found to be ferrous sulfide and iron thiocyanate. Investigation leading to a solution of this problem resulted in the data contained in the following table.

*Table 1.—Effect of temperature, concentration of ammonium thiocyanate and the presence of air on corrosion rates in ammonium thiocyanate solution at 1 atmosphere $H_2S$ partial pressure-corrosion rates in mils per year*

| Ammonium Thiocyanate, percent W. | 10 | | | | | | 30 | | | | Saturated | | | |
|---|---|---|---|---|---|---|---|---|---|---|---|---|---|---|
| pH Range [1] | 7.3±.1 | | | 8.4±.1 | | | 7.4±.1 | | 8.4±.1 | | 5.4±.1 | | | |
| Temperature, °F | 85 | 85 | 190 | 85 | 85 | 190 | 160 | 160 | 160 | 160 | 85 | 85 | 195 | 195 |
| Air Present | No | Yes | Yes | No | Yes | Yes | No | Yes | No | Yes | No | Yes | No | Yes |
| A-285 Grade C Steel | 1 | <1 | 200 | 7 | <1 | 2 | 5 | 200 | 4 | 200 | 10 | 20 | 500 | 1,000 |
| Inconc | [2]<1 | <1 | <1 | 4 | <1 | <1 | <1 | <1 | <1 | <1 | | | | |

[1] Ammonium hydroxide added to the ammonium thiocyanate solution to produce hese pH's after saturation with hydrogen sulfide.
[2] < = less than.

As this table shows, ammonium thiocyanate can cause high corrosion rates in the presence of air or polysulfide at elevated temperatures in both acid and alkaline solutions. However, if the concentration of ammonium thiocyanate is kept below about 10% by weight based on the aqueous phase and the pH is maintained above 7.8, corrosion rates are extremely low even at temperatures as high as 190° F. Consequently, where conditions exist permitting the accumulation of ammonium thiocyanate and the aqueous phase of gas recovery systems to the point where more than about 10% by weight of ammonium thiocyanate is present, the addition of a sufficient amount of water to the absorber columns in the gas recovery system will reduce the concentration of the thiocyanate to such a point that corrosion no longer takes place.

In accordance with one phase of the present invention it is unnecessary to add pre-formed polysulfide since it has been found possible to form polysulfide ions in situ by the addition of an inorganic oxidizing agent to the system containing hydrogen sulfide in the presence of an aqueous alkaline phase. Under these conditions, a portion at least of the hydrogen sulfide is oxidized to form free sulfur which in turn is dissolved in the alkaline aqueous phase and combines with dissolved sulfide in said phase to form a dissolved polysulfide. The inorganic oxidizing agent is preferably an oxygen-containing gas and may be either oxygen per se, air, or mixtures thereof. Hence, in accordance with one aspect of the invention the operation thereof is readily perceived as one preferably involving the determination of the rate of hydrogen penetration as indicated by the standard hydrogen activity probe and thereafter introducing into the system a calculated amount of oxygen-containing gas, periodically or continuously thereafter adjusting the rate of oxygen (or other oxidizing agent) introduction to form sufficient polysulfide ions for the reduction of hydrogen penetration to a desired low value. The amount of oxidizing agent added should be insufficient to oxidize all of the $H_2S$, but sufficient to react with all of any cyanide present in the system. The rate of reaction between oxygen and hydrosulfide ions is relatively slow, and in cases where little hydrogen sulfide is present or the gas rate is relatively slow, excess unreacted oxygen can accumulate in stagnant vapor areas. It has been noted that this local excess of oxygen itself can lead to hydrogen penetration. This condition can be eliminated by maintaining in the system an amount of oxygen only slightly in excess of that necessary to react with all of the cyanide present therein, but insufficient to react with all of the hydrogen sulfide present.

The curves given in Figure II illustrate the advantages to be gained by the process of the present invention. The curves in Figure II constitute data which may be obtained by the treatment of refinery streams containing an aqueous phase having dissolved therein ammonium hydroxide saturated with hydrogen sulfide at atmospheric pressures. The pH of this aqueous phase is arbitrarily adjusted at about 8.7. Curve A in Figure II indicates the rate at which hydrogen penetration occurs in such a system. Curve C is similar thereto until after the fourth day at which point 0.1 g. of dissolved sulfur (as ammonium polysulfide) per liter of aqueous phase was introduced. It will be noted that following the introduction of ammonium polysulfide the rate of hydrogen penetration was reduced sharply to a negligible figure for approximately three days. At this point the hydrogen penetration again became relatively rapid and a further 0.1 g. of dissolved sulfur as ammonium polysulfide per liter of aqueous phase was added. It will be found that this further addition reduced the hydrogen penetration to substantially nil, at least for a further week. Curve D indicates the effect of cyanide ions upon the conditions existing in the system of curve A. The original system was modified during the second day by the introduction of 2 g. of dissolved sulfur in the form of ammonium polysulfide per liter of the aqueous phase at which point the rate of hydrogen penetration dropped to substantially 0. During this period of inactivity successive portions of cyanide ions were introduced in the form of potassium cyanide in amounts calculated to be insufficient to completely react with the ammonia polysulfide present. During the eighth day a final portion of cyanide was added sufficient to react with all of the ammonium polysulfides which remained. It will be noted that hydrogen penetration immediately became excessive.

The complete protection of a system from hydrogen penetration by the introduction of ammonium polysulfide is indicated by curve B, wherein the original system was modified during the second day by the introduction of 0.25 g. of dissolved sulfur in the form of ammonium polysulfide per liter of the aqueous phase. It will be noted that the proportion of ammonium polysulfide was sufficient to cause substantially perfect inhibition of hydrogen activity for a period of about 2 weeks.

This application is a continuation-in-part of our copending application Serial No. 337,308, filed February 17, 1953, now abandoned.

We claim as our invention:

1. In a process wherein a hydrocarbon product in gaseous state containing hydrogen sulfide and an aqueous phase is contacted in a confined system by a ferruginous metal under conditions which normally result in hydrogen blistering of said metal, the improvement comprising maintaining said aqueous phase at a pH between 7.8 and about 8.3 by the introduction of ammonia, and introducing air into the system whereby hydrogen sulfide is oxidized to produce sulfur, and said sulfur dissolves in the aqueous phase to form soluble polysulfides in an amount sufficient to maintain substantial inhibition of hydrogen blistering of said metal the amount of air introduced being insufficient to oxidize all of the hydrogen sulfide.

2. In a process wherein a hydrocarbon product containing hydrogen sulfide, ammonia and water is contacted in a confined system by a ferruginous metal under conditions which normally result in hydrogen blistering said metal, the improvement comprising maintaining said water at a pH between about 7.8 and about 8.3 by the introduction of ammonia, and introducing an oxygen-containing gas into the system, whereby hydrogen sulfide is oxidized to produce sulfur and said sulfur dissolves in the water and reacts with ammonia and hydrogen sulfide to form ammonium polysulfides in an amount of between about 0.01% and about 0.5% by weight of the aqueous phase, said polysulfide concentration being maintained to substantially inhibit hydrogen blistering of said metal the amount of air introduced being insufficient to oxidize all of the hydrogen sulfide.

3. In a process wherein a hydrocarbon product containing hydrogen sulfide, ammonia and water is contacted in a confined system by a ferruginous metal under conditions which normally result in hydrogen blistering of said metal, the improvement comprising maintaining said water at a pH between about 7.8 and about 8.3 by the introduction of ammonia, and introducing air into the system, whereby hydrogen sulfide is oxidized to produce sulfur and said sulfur dissolves in the water to form ammonium polysulfides in an amount of between about 0.02 and about 0.1% by weight of the aqueous phase, said polysulfides concentration being maintained to substantially inhibit hydrogen blistering of said metal the amount of air introduced being insufficient to oxidize all of the hydrogen sulfide.

4. In a process for recovering and separating the effluent gases from a cracking unit into normally gaseous hydrocarbon products and normally liquid hydrocarbon products of the nature of gasoline, which products contain a hydrogen blistering proportion of hydrogen sulfide and cyanide, the combination of steps of intimately contacting said effluent gases with an aqueous solution of a polysulfide in gas recovery vessels and maintaining a concentration of polysulfide between about 0.01% and about 0.5% by weight of the aqueous phase in said vessels, said amount being sufficient to substantially reduce the hydrogen blistering of metals containing the bases, the pH of the aqueous phase of said mixture being simultaneously maintained between 7.8 and 8.3 the polysulfide concentration being maintained by introduction of air in an amount sufficient to convert all of the cyanide ions to thiocyanate ions and insufficient to oxidize all of the hydrogen sulfide present.

5. In a process wherein a hydrocarbon product containing hydrogen sulfide and an aqueous phase is contacted by a ferruginous metal under conditions which normally result in hydrogen blistering of said metal, the improvement comprising maintaining said aqueous phase at a pH between 7.8 and 8.3 and introducing a minor proportion of oxygen into the system, whereby a portion of the hydrogen sulfide is oxidized to produce sulfur, and said sulfur dissolves in the alkaline aqueous phase containing sulfide to form a polysulfide in an amount sufficient to maintain substantial inhibition of hydrogen blistering of said metal said amount being between about 0.01% and about 0.5% by weight of the aqueous phase, and the amount of oxygen introduced being insufficient to oxidize all of the hydrogen sulfide.

6. A process according to claim 5 wherein the process comprises pumping operations in a crude oil well containing hydrogen sulfide.

7. A process according to claim 5 wherein the process comprises transporting hydrogen sulfide-containing crude oil in a pipeline.

8. A process according to claim 5 wherein the process comprises recovery of straight run refinery gases containing hydrogen sulfide.

9. In a process wherein a gaseous hydrocarbon product, containing contaminating amounts of an aqueous phase, hydrogen sulfide and a cyanide is confined in a ferruginous metal vessel under conditions which normally result in hydrogen damage thereto, the improvement comprising introducing an oxygen-containing gas into said vessel, whereby part of said sulfide ions are converted to polysulfide ions, the amount of polysllfide formed being sufficient to convert substantially all of said cyanide to thiocyanate, and the amount of air being insufficient to react with all of said sulfide, the pH of the aqueous phase being maintained between about 7.8 and about 8.3 the amount of oxygen being insufficient to oxidize all of the hydrogen sulfide present in the system.

10. A process according to claim 9 wherein the concentration of by-product thiocyanate in the aqueous phase is maintained below about 10% by weight calculated as ammonium thiocyanate.

References Cited in the file of this patent

UNITED STATES PATENTS

| | | |
|---|---|---|
| 1,300,816 | Cobb | Apr. 15, 1919 |
| 1,844,475 | Morrell et al. | Feb. 9, 1932 |
| 2,020,661 | Schllze et al. | Nov. 12, 1935 |
| 2,034,837 | Schulze et al. | Mar. 24, 1936 |
| 2,499,435 | Whitacre | Mar. 7, 1950 |